United States Patent
Punathil

(10) Patent No.: US 11,853,749 B2
(45) Date of Patent: Dec. 26, 2023

(54) MANAGING CONTAINER IMAGES IN GROUPS

(71) Applicant: INTERNATIONAL BUSINESS MACHINES CORPORATION, Armonk, NY (US)

(72) Inventor: Gireesh Punathil, Kannur (IN)

(73) Assignee: INTERNATIONAL BUSINESES MACHINES CORPORTATION, Armonk, NY (US)

(*) Notice: Subject to any disclaimer, the term of this patent is extended or adjusted under 35 U.S.C. 154(b) by 0 days.

(21) Appl. No.: 18/088,092

(22) Filed: Dec. 23, 2022

(65) Prior Publication Data

US 2023/0127523 A1 Apr. 27, 2023

Related U.S. Application Data

(63) Continuation of application No. 17/459,003, filed on Aug. 27, 2021, now Pat. No. 11,579,867.

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC ..................................... G06F 8/71; G06F 8/65
USPC ........................................................ 717/121
See application file for complete search history.

(56) References Cited

U.S. PATENT DOCUMENTS

| | | |
|---|---|---|
| 2018/0039516 A1 | 2/2018 | Biran et al. |
| 2018/0060125 A1 | 3/2018 | Bhimani et al. |
| 2019/0146772 A1 | 5/2019 | Griffin et al. |
| 2019/0324865 A1 | 10/2019 | Weissman et al. |
| 2020/0150940 A1* | 5/2020 | Li .............. G06F 8/443 |
| 2020/0160485 A1 | 5/2020 | Thakkar et al. |
| 2022/0019455 A1 | 1/2022 | Cao et al. |

OTHER PUBLICATIONS

Nathan et al, "CoMICon: A Co-operative Management System for Docker Container Images", 2017, [Online], pp. 116-126, [Retrieved from internet on Jul. 20, 2023], <https://ieeexplore.ieee.org/stamp/stamp.jsp?arnumber=7923794> (Year: 2017).*
Mell et al., "The NIST Definition of Cloud Computing", NIST, Special Publication 800-145, Sep. 2011, 7 pages.
List of IBM Patents or Patent Applications Treated as Related, dated Dec. 21, 2022, 1 page.

(Continued)

*Primary Examiner* — S. Sough
*Assistant Examiner* — Zengpu Wei
(74) *Attorney, Agent, or Firm* — Monchai Chuaychoo; Andrew D. Wright; Calderon Safran & Cole. P.C.

(57) ABSTRACT

A method includes: creating, by a computing device, a container image group; adding, by the computing device, container images which share file characteristics into the container image group; defining, by the computing device, a homogeneity of the container image group; and applying, by the computing device, a life cycle action on image layers of the container images within the container image group based on the homogeneity of the container image group.

18 Claims, 5 Drawing Sheets

(56) References Cited

OTHER PUBLICATIONS

Pahl, "Containerization and the PaaS Cloud", 2015, [Online], pp. 24-31, [Retrieved from internet on Sep. 15, 2022], <https:// ieeexplore.ieee.org/stamp/stamp.jsp?tp=&arnumber=7158965> (Year: 2015), 8 pages.

Specification "Managing Container Images in Groups" and Drawings in U.S. Appl. No. 17/459,003, filed Aug. 27, 2021, 33 pages.

\* cited by examiner

MANAGING CONTAINER IMAGES IN GROUPS

BACKGROUND

Aspects of the present invention relate generally to software containers and, more particularly, to managing container images in groups.

A container is a stand-alone executable package of a piece of software that includes everything for running the software, including application code, runtime, system tools, system libraries, and settings. Containers are lightweight and include layers of filesystems, e.g., sharing common files, making disk usage and image downloads efficient. Containers run in various environments, including but not limited to a local computing device (e.g., a desktop or a laptop), physical or virtual machines in a data center, and cloud providers.

SUMMARY

In a first aspect of the invention, there is a computer-implemented method including: creating, by a computing device, a container image group; adding, by the computing device, container images which share file characteristics into the container image group; defining, by the computing device, a homogeneity of the container image group; and applying, by the computing device, a life cycle action on image layers of the container images within the container image group based on the homogeneity of the container image group.

In another aspect of the invention, there is a computer program product including one or more computer readable storage media having program instructions collectively stored on the one or more computer readable storage media. The program instructions are executable to: create a container image group; add container images which share file characteristics into the container image group; define a homogeneity of the container image group; and extract and replace image layers of the container images within the container image group based on the homogeneity of the container image group.

In another aspect of the invention, there is system including a processor, a computer readable memory, one or more computer readable storage media, and program instructions collectively stored on the one or more computer readable storage media. The program instructions are executable to: create container image groups; add container images which share file characteristics into a container image group of the container image groups; define base image layers of the container images within the container image group based on the shared file characteristics; and apply life cycle actions on the base image layers by extracting the image layers of the container images within the container image group and replacing the base image layers with new base image layers.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
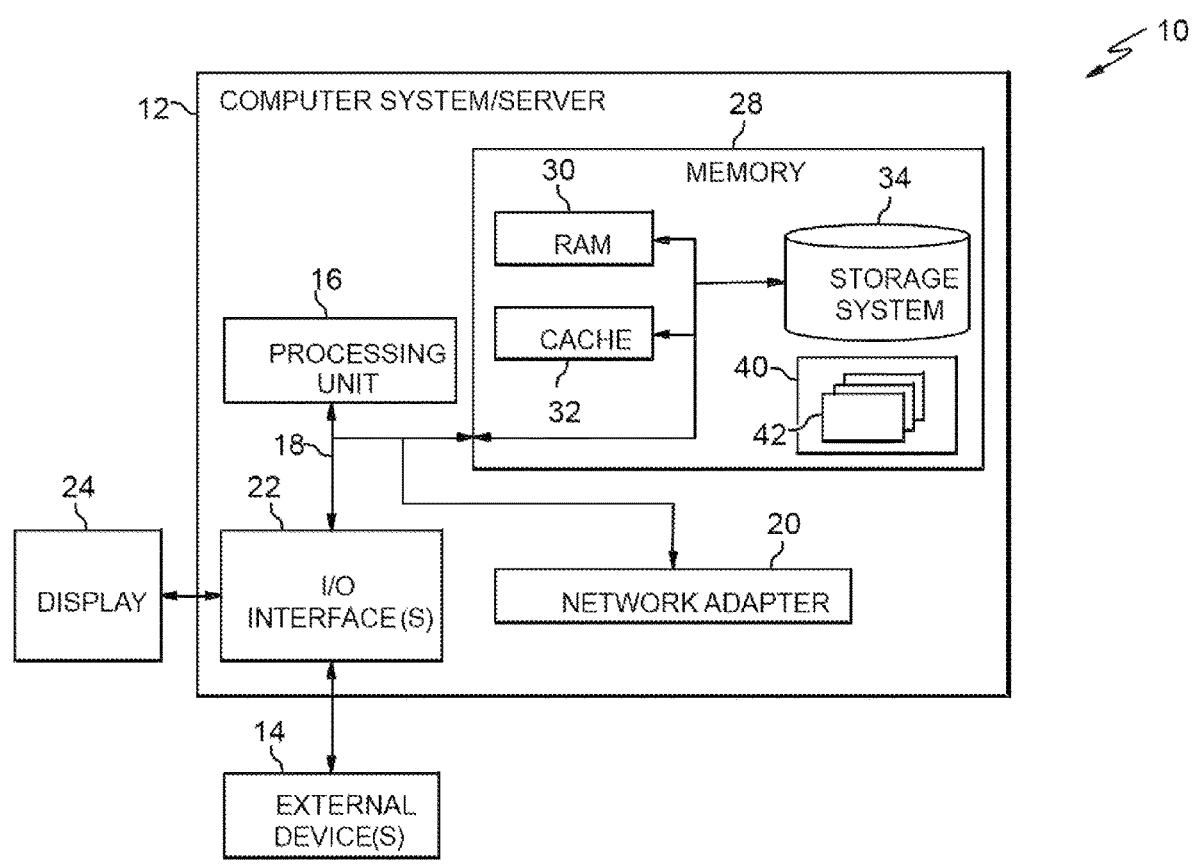
FIG. 1 depicts a cloud computing node according to an embodiment of the present invention.

Aspects of the present invention relate generally to software containers and, more particularly, to managing container images in groups. According to aspects of the invention, systems and methods group container images together. In embodiments, grouping of container images occurs based on container images sharing a genus. In further embodiments, aspects of the invention apply a life cycle action as a class action across all the container images within the group. In this manner, implementations of the invention define and manage container images in groups to apply life cycle actions to the container images as class actions.

In embodiments, a container has multiple representations in a computing device. One representation occurs in a file system of the computing device. Another representation occurs in an operating system of the computing device. In embodiments, a container image is a disc representation of the container which allows for recreation of the container. In further embodiments, a life cycle of a container includes different actions during a container's existence, e.g., adding a software element, removing a software element, scoping a software element, generating a software element, and building a software element. In aspects of the invention, systems and methods define and manage the container images as groups for application of life cycle actions as class actions to all container images within the group. Accordingly, aspects of the invention ensure the application of life cycle actions to the container images.

Implementations of the invention provide improvements to computer technologies by reducing the consumption of computing resources. In embodiments, aspects of the invention group container images together which share some of the same file characteristics in their base image layers. By grouping container images together which share file characteristics, aspects of the invention allow for defining a homogeneity of a group. Based on the homogeneity, aspects of the invention apply life cycle actions to the container images within the container image group as class actions across all the container images within the container image group, rather than applying each life cycle action individually to each container image. In this way, aspects of the invention improve computing technologies by ensuring the application of life cycle actions to container images based on the homogeneity occurs only once, while also eliminating a need to repeat the application of the life cycle actions individually to each container image. Accordingly, aspects of the invention improve computer technologies by reducing a consumption of computing resources by reducing the application of life cycle actions to container images.

Implementations of the invention also allow for the practical application of reducing repeatable life cycle actions on container images by grouping together container images which share some of the same file characteristics in their base image layers, defining a homogeneity of the container image group, and applying a life cycle action to the container image group based on the homogeneity. In this way, aspects of the invention apply class actions across an entire class of container images within the same group, instead of individually applying life cycle actions to each individual container image. Accordingly, there is a reduction in the application of life cycle actions. By reducing the application of life cycle actions, aspects of the invention allow for the practical application of reducing the consumption of computing resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
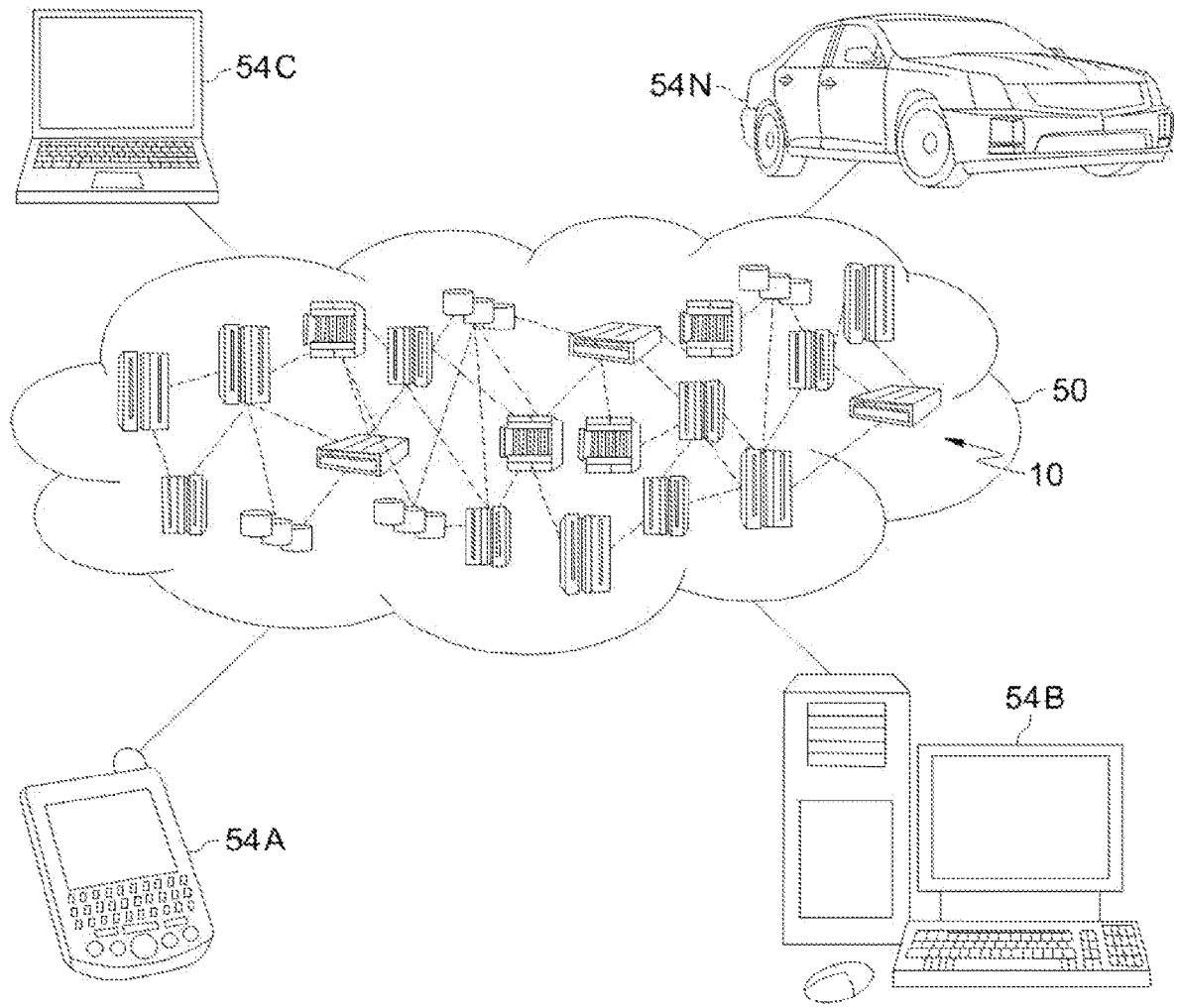
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
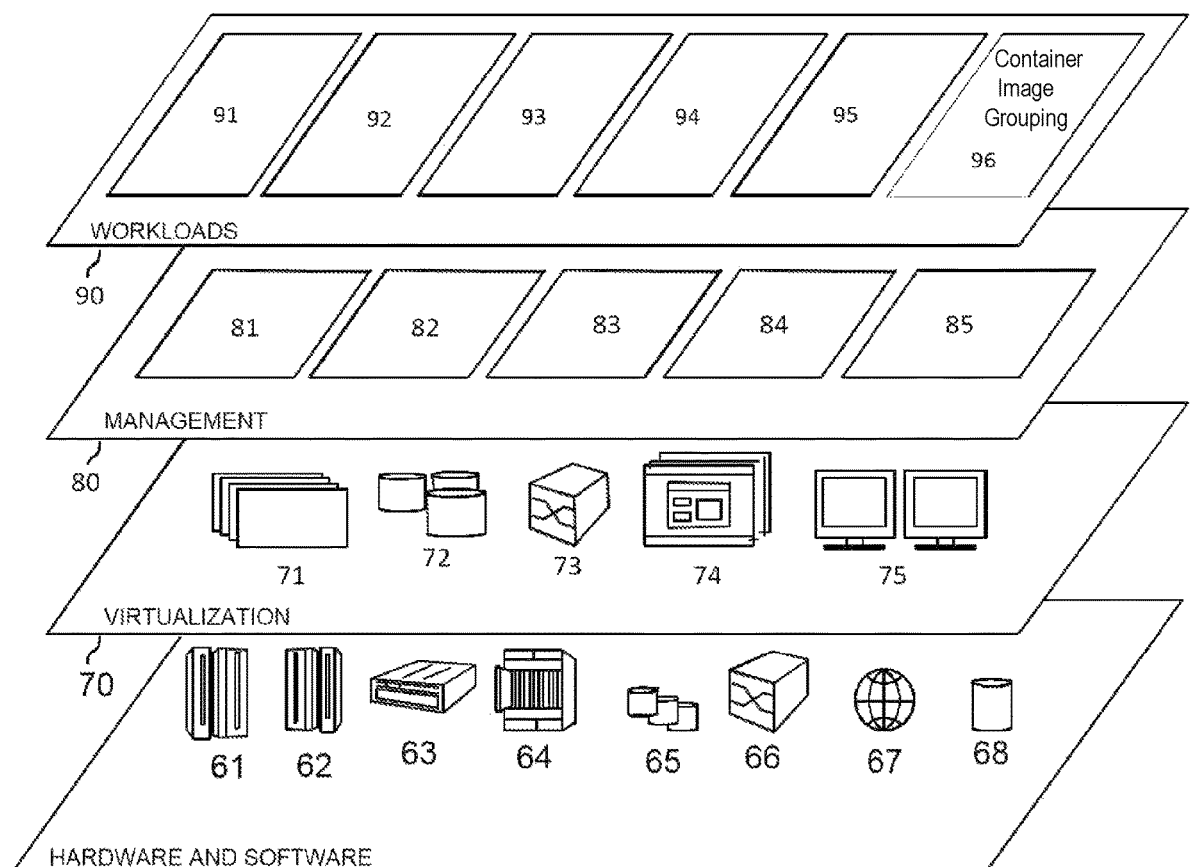
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image grouping 96.

Implementations of the invention may include a computer system/server 12 of FIG. 1 in which one or more of the program modules 42 are configured to perform (or cause the computer system/server 12 to perform) one of more functions of the container image grouping 96 of FIG. 3. For example, the one or more of the program modules 42 may be configured to: a) create a container image group; b) add container images which share file characteristics into a container image group; c) define a homogeneity of the container image group; and d) apply life cycle actions to image layers of the container images within the container image group based on the homogeneity. In view of this unconventional arrangement of steps, embodiments of the invention reduce a repeating of life cycle actions, thereby reducing a consumption of computing resources while also ensuring the application of life cycle actions to the container images.

Figure 4:
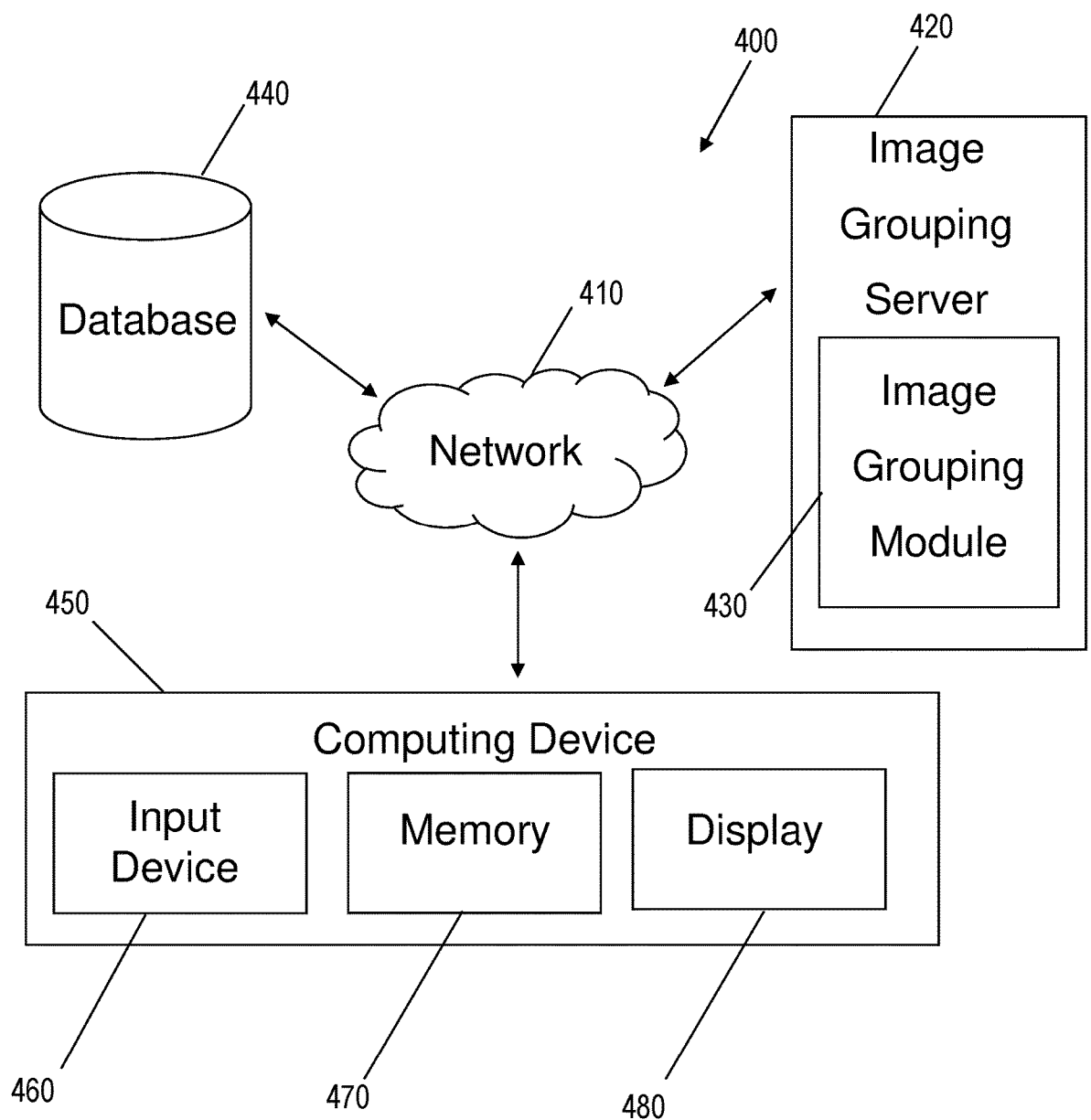
FIG. 4 shows a block diagram of an exemplary environment in accordance with aspects of the invention.

FIG. 4 shows a block diagram of an exemplary environment in accordance with aspects of the invention. In embodiments, the environment 400 includes a network 410, an image grouping server 420, a database 440, and a computing device 450 that includes an input device 460, a memory 470 which stores a container creation software, and a display device 480 for viewing information. In embodiments, the computing device 450 is a user device, e.g., a desktop computer, a laptop computer, a tablet, a smartphone, amongst other examples, comprising one or more components of computer system/server 12 of FIG. 1. The image grouping server 420 is a computing device comprising one or more components of computer system/server 12 of FIG. 1. In further embodiments, the input device 460 includes a keyboard, mouse, camera, and/or a microphone, amongst other input devices.

In embodiments, the image grouping server 420 comprises an image grouping module 430, which comprises one or more program modules such as program modules 42 described with respect to FIG. 1. The image grouping server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

In embodiments, workloads run in container stacks. An example of a workload is the running of an application, e.g., running a word processing application. In embodiments, a container stack is a plurality of containers which run the application. In further embodiments, a container image is a disc representation of the container which allows for recreation of the container.

In embodiments, some containers have lineage from a monolithic architecture. An example of a monolithic architecture is a computing architecture which handles all the responsibilities of running an application. In embodiments, a user decomposes the monolithic architecture into a micro-service architecture. An example of a user is a software developer, a software engineer, a software architect, a programmer, or other software professional, amongst other examples. In embodiments, each micro-service in the micro-service architecture executes a responsibility of the responsibilities which the monolithic architecture hosts.

In embodiments, each container hosts a different micro-service of the micro-service architecture. In this way, containers have a lineage from a monolithic architecture since each container hosts a responsibility of the monolithic architecture by hosting a micro-service which executes a responsibility of the monolithic architecture. In embodiments, these containers share some of the same file characteristics within their layers based on their lineage from the same monolithic architecture. As an example of a file characteristic, each container hosts a micro-service containing the same software in order to run a specific application. As a more specific example, containers include the same open source software to run a web application. In this example, the open source software is a file characteristic which the containers share. Since a container image is a disc representation of the container, the container image also includes the file characteristics of the container that the container image represents. Accordingly, container images will share some of the same file characteristics.

In embodiments, the image grouping module 430 groups container images together based on the container images sharing some of the same file characteristics. In embodiments, the grouping of the container images begins with a user instructing the image grouping module 430 to create container image groups. In embodiments, the user instructs the image grouping module 430 to create the container image groups by entering a software command through the input device 460 of the computing device 450. For example, the user enters a software command of "$ buildah group create foo" by entering the command through the input device 460 of the computing device 450. In this example, the image grouping module 430 executes a Buildah computing tool (a command-line tool for building open container initiative-compatible images) to create a container image group with the name of "foo." Further, this software command instructs the image grouping module 430 to maintain an internal data structure that represents a container image group with the name "foo." In embodiments, the image grouping server 420 receives the software command through the network 410 for execution by the image grouping module 430.

In embodiments, the grouping of the container images continues with the image grouping module 430 inspecting container images to determine which file characteristics are present in the container images. In embodiments, each container image includes a plurality of image layers, with each image layer containing files for executing the functionality that the container hosts. In embodiments, a bottom set of image layers in each container image are base image layers which contain original files from the container origination. Specifically, containers which originate from the same monolithic architecture or containers which host micro-services for the same application will share some of the same file characteristics in their base image layers based on the container origination.

In embodiments, as changes occur to each container, the container image adds new image layers above the base image layers to account for these changes. An example of a change to the container is the user executing a "run" command on the container. The container image creates a new image layer above the base image layers to account for this change on the container by executing the run command. Accordingly, each image layer above the base image layers represents a change to the container that is represented in the container image. As a further example, the first three layers of each container image originating from a word processing application have some of the same file characteristics at the base image layers, while the fourth image layer and the fifth image layer above the first three image layers are different than the base image layers. In this way, the image layers above the base image layers are different between container images based on different changes to each container.

In embodiments, the image grouping module 430 obtains the container image from an image registry and inspects the image layers of the container images. In embodiments, an image registry is an application which stores and distributes the container images. In further embodiments, the image registry resides in the database 440 and is accessible by the image grouping server 420 through the network 410 for use by the image grouping module 430.

In embodiments, in response to the image grouping module 430 obtaining the container images from the image registry, the user then executes an inspection computing tool to inspect file characteristics of each image layer of the container images. In embodiments, the inspection computing tool is part of the container creation software application on the computing device 450, which creates the containers and corresponding container images. In embodiments, the container creation software application and corresponding inspection computing tool reside within a memory 470 of the computing device 450, and are accessible by the image grouping server 420 through the network 410 for use by the image grouping module 430.

In embodiments, the user executes the inspection computing tool using the input device 460. As an example, the user manually executes the inspection computing tool by entering through the input device 460 a "dive" command of the container creation software application.

In embodiments, during inspection of the image layers, file characteristics of each layer appears to the user on a display 480 of the computing device 450. In view of the user's software knowledge, the user recognizes that specific file characteristics are present in the base image layers of different container images. As an example, the user recognizes that the file characteristics in the base image layers of each container image across several container images contain the same programming language. Since the container images share some of the same file characteristics, the user determines these are similar container images.

In embodiments, in response to the user determining the container images share some of the same file characteristics, the user instructs the image grouping module 430 to add these container images together in a container image group. In this way, each container image group contains container images which share some of the same file characteristics in the base image layers.

In embodiments, the user instructs the image grouping module 430 to add the container images which share some of the same file characteristics together into the same container image group. As an example, the user instructs the image grouping module 430 by entering the following commands using the input device 460: 1) $ buildah group add foo img1:v7; 2) $ buildah group add foo img2:v1; 3) $ buildah group add foo img3:v4; and 4) $ buildah group add foo img4:v12. In this example, the "add" instruction instructs the image grouping module 430 to add the container images to the foo container image group. Specifically, these commands instruct the image grouping module 430 to add the first container image "img1," the second container image "img2," the third container image "img3,", and the fourth container image "img4" into the "foo" container image group. In alternative embodiments, the image grouping module 430 automatically adds the similar container images which share the file characteristics into the container image group using machine learning.

In embodiments, the image grouping module 430 uses machine learning to learn which container images are present in the container image group. Specifically, as the user places specific container images into specific container image groups, the image grouping module 430 compiles container image grouping data as training data. In embodiments, the training data includes which file characteristics present in the image layers of each container image, how many image layers share some of the same file characteristics, and the commands to add the similar container images into the container image groups. As the training data compiles over time, a knowledge corpus of which file characteristics belong to which container image group develops. In embodiments, the knowledge corpus resides within the database 440 and is accessible by the image grouping server 420 through the network 410.

In embodiments, once the container image groups have container images which share some of the same file characteristics, the image grouping module 430 defines a homogeneity of the container image groups based on these shared file characteristics. In embodiments, a homogeneity of the container image group refers to a level of the container image layers that share some of the same file characteristics (e.g., a third image layer).

In embodiments, to define the homogeneity of the container image group, the image grouping module 430 reviews the file characteristics of all the image layers of all the container images within the container image group. In this way, the image grouping module 430 defines the base image layers by reviewing all image layers of the container images. In view of the machine learning, the image grouping module 430 determines up to which image layer all the container images share some of the same file characteristics as the homogeneity. As an example, the image grouping module 430 determines that the first three image layers of all the container images within the container image group are homogeneous since the container images share some of the same file characteristics in these first three image layers. In view of this homogeneity determination, the image grouping module 430 defines these first three image layers as the base image layers. Accordingly, in response to receiving new container images within the container image group, the image grouping module 430 reviews the file characteristics in the first three layers for the new container images in view of the homogeneity of the container image group. In this way, the image grouping module 430 determines the homogeneity of the container image group, which defines the base image layers of the container images within the container image group.

In embodiments, in response to determining the homogeneity of the container image group, the image grouping module 430 develops commands for inspecting new container images in order to determine which of the new container images (if any), the image grouping module 430 will add to the container image group. An example of a command is "$ buildah group foo scope 3," with the command "scope" instructing the image grouping module 430 to inspect the bottom first three image layers of all the container images within the "foo" container image group in view of the integer "3," with "3" indicating the homogeneity of the "foo" group is the first three layers. In embodiments, in response to a new container image, the image grouping module 430 determines if the file characteristics of the first three layers of the new container image match some (e.g., a threshold amount) of the file characteristics in the first three layers of the container image group. In response to the image grouping module 430 determining that the new container image has some (e.g., a threshold amount) file characteristics which match, the image grouping module 430 automatically adds the new container image to the container image group.

In embodiments, in response to determining the homogeneity of the container image, the user determines a genus of the container image group based on the homogeneity of the group. In embodiments, a genus is an application, and the containers host micro-services which execute a responsibility of the application. Specifically, the user knows from their software knowledge that specific file characteristics belong to specific applications. For example, the user recognizes that some of the file characteristics of the base image layers represent a programming language which is found in internet browsing applications. In view of this recognition, the user determines that these container images share a genus of an internet browsing application, even if container images do not share some of the same file characteristics in the image layers above the base image layers. For example, a first container may have image layers above the base layers which indicate a version v8 of the programming language, while a second container image may have image layers above the base layers which indicate a version v7 of the programming language. Accordingly, even though the container images do not share all the same file characteristics, the user is able to determine that container images share the same genus of an internet browsing application based on the file characteristics for the same programming language in the base layers of the container images. In embodiments, each container image group represents a different genus.

In embodiments, the image grouping module 430 collects information regarding the genus of the container image group and adds the genus information to the training data for machine learning. Accordingly, as the knowledge corpus grows to include the genus information, the image grouping module 430 is able to determine the genus for new container image groups based on the file characteristics present in base image layers of the container images within the new container image groups. As an example, the image grouping module 430 defines the new "foo" container image group as a GPS application genus based on the container images sharing some of the same file characteristics present in the base image layers of the container images within the container image group. In this way, in response to determining the base image layers, the image grouping module 430 defines the genus based on the container images sharing some of the same file characteristics in their base layer images.

In embodiments, after defining the genus of the container image group, the user determines which life cycle action to apply to the container image based on the genus. In embodiments, life cycle actions are actions applicable to a container image during a container's existence. Examples of life cycle actions include adding a software element, removing a software element, scoping a software element, generating a software element, and building a software element. Specific examples of life cycle actions include updating a security patch as adding a software element, deleting files within the base image layers as removing a software element, rebuilding a container image as building a software element, and redeploying a container image as generating a software element, amongst other examples.

In embodiments, based on the genus, the user recognizes that this specific genus of the container image group has a security patch update available as a life cycle action. In this example, the user instructs the image grouping module 430 to update the container images in a container image group with the security patch since these container images share the same genus. As a more specific example, during the defining of the homogeneity of the container image group, the image grouping module 430 determines that the first three image layers are the base image layers for all the container images within the container image group. In this example, the image grouping module 430 applies the life cycle action to the first three image layers of each container image within the container image group since the homogeneity of the group is in the first three image layers. In further embodiments, since the application of the life cycle action occurs across all container images within the container image group, this is a class action.

In embodiments, the application of the life cycle actions includes the image grouping module 430 extracting the base image layers of the container images within the container image group. In this way, the application of the life cycle action occurs on the base image layers of all the container images within the container image group. In response to extracting the base image layers, the image grouping module 430 applies the life cycle action to the container images by replacing these base layer images with new base image layers which include the application of the life cycle action. As an example, if the life cycle action includes updating a security patch in the container images, the new base image layers will include the security patch.

In embodiments, the image grouping module 430 rebuilds the container image group after applying the life cycle action. As an example, the image grouping module 430 executes the command "$ buildah group foo build," which instructs the image grouping module 430 to rebuild the "foo" group.

In embodiments, in response to rebuilding the container image group, the image grouping module 430 implements tagging decisions to update the tags of the container image. As an example, a tag of the container image indicates prior to the application of the life cycle action that the container image contains the seventh version (v7) of the programming language. In this example, in response to the application of the life cycle action, the image grouping module 430 will update the tag of the container image to indicate the container image now contains the eight version (v8) of the programming language. In embodiments, the updating of the tags occurs by auto-increment. In further embodiments, the updating of the tags occurs by common tagging, in which the image grouping module 430 applies a general tag indicating the application of the life cycle action. In embodiments, the image grouping module 430 may automatically push the container images into a production environment to recreate the containers in response to the application of the life cycle action. As an example, in response to the container images now having a current version, e.g., (v8), of the programming language, the container image is up to date and therefore ready for the production environment.

In embodiments, the image grouping module 430 tracks the application of life cycle actions to container image groups, and adds these life cycle actions to the training data for machine learning. Accordingly, as the knowledge corpus grows to include these life cycle actions, the image grouping module 430 is able to determine which life cycle action to apply to which container image group. In this way, the image grouping module 430 may automatically apply the life cycle actions onto the base image layers of all the container images within the container image group based on machine learning rules determined over time.

Figure 5:
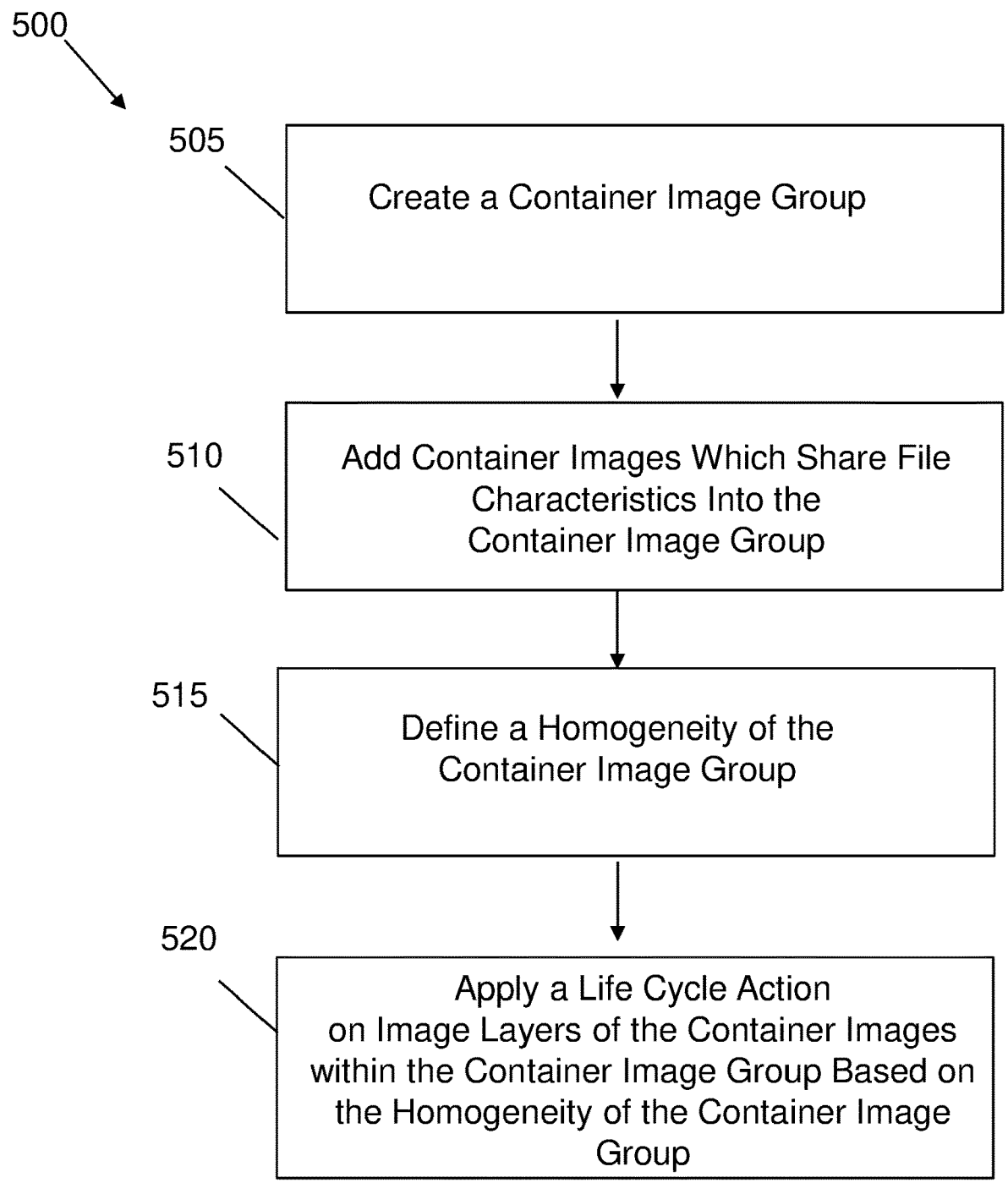
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the image grouping module 430 creates a container image group. In embodiments, and as described with respect to FIG. 4, the image grouping module 430 creates the container image group in response to a software command.

At step 510, the image grouping module 430 adds container images which share file characteristics into the container image group. In embodiments, and as described with respect to FIG. 4, the image grouping module 430 adds container images which share some of the same file characteristics together into container image groups in response to a software command from the user.

At step 515, the image grouping module 430 defines a homogeneity of the container image group. In embodiments, and as described with respect to FIG. 4, the image grouping module 430 defines the homogeneity of the container image group by determining up to what image layer of the image layers that the container images within the container image group share some of the same file characteristics. In embodiments, the image layers which share some of the same file characteristics are the base image layers, and defining the homogeneity of the container image group comprises defining the base image layers for the container image group.

At step 520, the image grouping module 430 applies a life cycle action on image layers of the container images within the container image group based on the homogeneity of the container image group. In embodiments, and as described with respect to FIG. 4, the homogeneity defines the base image layers of the container images. In embodiments, the image grouping module 430 extracts these base image layers of all the container images within the container image group, and replaces them with new base image layers which include the application of the life cycle action. In embodiments, the image grouping module 430 rebuilds the container image group with the container images with the new base image layers, thereby generating an updated container image group.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing device, container image grouping data comprising container image groups of container images that share file characteristics;
    compiling, by the computing device, the container image grouping data as training data for rule-based machine learning, the training data comprising:
        file characteristics present in image layers of each container image;
        a number of the image layers in each container image group of the container images that share the file characteristics; and
        commands to add similar container images into the container image groups;
    training, by the computing device, machine learning rules using the training data to:
        identify for at least one container image a container image group comprising container images that share file characteristics with the at least one container image; and
        identify at least one command to add the at least one container image into the container image group; and
    storing, by the computing device, the machine learning rules in a database.

2. The method of claim 1, wherein the training machine learning rules further comprises using the training data to identify a life cycle action to apply to the container image group.

3. The method of claim 2, further comprising receiving, by the computing device, the at least one container image.

4. The method of claim 3, further comprising applying, by the computing device, the machine learning rules that identify for the at least one container image the container image group comprising the container images that share the file characteristics with the at least one container image.

5. The method of claim 4, further comprising determining, by the computing device, based on the machine learning rules the at least one command to add the at least one container image into the container image group.

6. The method of claim 5, further comprising adding, by the computing device, the at least one container image into the container image group by invoking the at least one command determined based on the machine learning rules.

7. The method of claim 6, further comprising determining, by the computing device, based on the machine learning rules the life cycle action to apply to the container image group.

8. The method of claim 7, further comprising automatically applying, by the computing device, the life cycle action to the container image group determined based on the machine learning rules.

9. The method of claim 1, wherein the container images share a lineage from a monolithic architecture.

10. A computer program product comprising one or more computer readable storage media having program instructions collectively stored on the one or more computer readable storage media, the program instructions executable to:
receive at least one container image;
identify based on machine learning rules a container image group comprising container images that share file characteristics with the at least one container image;
add the at least one container image into the container image group by invoking a command based on the machine learning rules; and
automatically apply a life cycle action to the container image group based on the machine learning rules.

11. The computer program product of claim 10, further comprising program instructions executable to identify based on the machine learning rules the command to add the at least one container image into the container image group.

12. The computer program product of claim 10, further comprising program instructions executable to determine the life cycle action to apply to the container image group based on the machine learning rules.

13. The computer program product of claim 10, wherein the machine learning rules are trained using training data to:
identify for the at least one container image the container image group comprising the container images that share the file characteristics with the at least one container image;
identify the command to add the at least one container image into the container image group; and
identify the life cycle action to apply to the container image group.

14. The computer program product of claim 13 wherein the training data comprises container image grouping data of plural container image groups of plural container images that share file characteristics.

15. A system comprising:
a processor, a computer readable memory, one or more computer readable storage media, and program instructions collectively stored on the one or more computer readable storage media, the program instructions executable to:
receive container image grouping data comprising container image groups of container images that share file characteristics;
compile the container image grouping data as training data for rule-based machine learning, the training data comprising:
file characteristics present in image layers of each container image;
a number of the image layers in each container image group of the container images that share the file characteristics; and
commands to add similar container images into the container image groups;
train machine learning rules using the training data to:
identify for at least one container image a container image group comprising container images that share file characteristics with the at least one container image; and
identify at least one command to add the at least one container image into the container image group; and
store the machine learning rules in a database.

16. The system of claim 15, wherein the training machine learning rules further comprises using the training data to identify a life cycle action to apply to the container image group.

17. The system of claim 16, wherein the program instructions are further executable to:
receive the at least one container image;
identify based on the machine learning rules the container image group comprising the container images that share the file characteristics with the at least one container image;
add the at least one container image into the container image group by invoking the at least one command based on the machine learning rules; and
automatically apply the life cycle action to the container image group based on the machine learning rules.

18. The system of claim 17, wherein the program instructions are further executable to apply the machine learning rules that identify for the at least one container image the container image group comprising the container images that share the file characteristics with the at least one container image and the machine learning rules that identify the at least one command to add the at least one container image into the container image group.

* * * * *